US012634856B2

(12) United States Patent
    Tanaka

(10) Patent No.: US 12,634,856 B2
(45) Date of Patent: May 19, 2026

(54) WIRELESS COMMUNICATION APPARATUS AND WIRELESS COMMUNICATION SYSTEM

(71) Applicant: CANON KABUSHIKI KAISHA, Tokyo (JP)

(72) Inventor: Yu Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 18/298,890

(22) Filed: Apr. 11, 2023

(65) Prior Publication Data

US 2023/0370988 A1 Nov. 16, 2023

(30) Foreign Application Priority Data

May 11, 2022 (JP) ................................. 2022-078498

(51) Int. Cl.
    *H04W 56/00* (2009.01)
(52) U.S. Cl.
    CPC ... *H04W 56/0035* (2013.01); *H04W 56/0015* (2013.01)
(58) Field of Classification Search
    CPC ......... H04W 56/0035; H04W 56/0015; H04W 56/005; H04W 56/001
    See application file for complete search history.

(56) References Cited

U.S. PATENT DOCUMENTS 7,450,902 B2 * 11/2008 Crivelli ............... H04L 27/2003
                                                      375/272
11,791,894 B2 * 10/2023 Hu ...................... H04W 56/001
                                                      398/30
2002/0129307 A1 * 9/2002 Walker .................... H04L 1/203
                                                      714/715
2014/0159788 A1 * 6/2014 Chen ..................... H03L 7/0807
                                                      327/156
2017/0214519 A1 * 7/2017 Park .................. H04W 56/0015
2019/0150072 A1 * 5/2019 Barzegar ................ H02P 29/40
                                                      370/338
2020/0389173 A1 * 12/2020 Jang ........................ H03L 7/087
2021/0320783 A1 * 10/2021 Masuda ................ H04L 7/0012

FOREIGN PATENT DOCUMENTS

JP         2014116982 A      6/2014

* cited by examiner

*Primary Examiner* — Ayman A Abaza
*Assistant Examiner* — Benjamin T. Ranew
(74) *Attorney, Agent, or Firm* — Canon U.S.A., Inc. IP Division

(57) ABSTRACT

A wireless communication apparatus includes a transmission circuit unit, a modulation unit, an encoding unit, a reception circuit unit, a phase adjustment unit, and an antenna unit, wherein the transmission circuit unit transmits a first modulated signal, as a first signal, which is encoded by the encoding unit based on a first clock signal and modulated by the modulation unit, to another wireless communication apparatus via a transmission path from the antenna unit, wherein the reception circuit unit generates a second clock signal based on a second signal received by the antenna unit from the other wireless communication apparatus, and wherein the phase adjustment unit detects a phase change caused by the transmission path based on the second clock signal, and controls a code of the first modulated signal based on the phase change.

8 Claims, 10 Drawing Sheets

2Δθ: PHASE CHANGE AMOUNT CAUSED BY VARIATION
   OF WIRELESS TRANSMISSION PATH CHARACTERISTIC

Δθ_A: PHASE DIFFERENCE BETWEEN FED-BACK
   CLOCK SIGNAL Sf AND REFERENCE CLOCK SIGNAL Sr

Δθ_B: PHASE DIFFERENCE BETWEEN IQ MODULATED
   SIGNAL Stx AND CLOCK SIGNAL Srx

WIRELESS COMMUNICATION APPARATUS AND WIRELESS COMMUNICATION SYSTEM

BACKGROUND

Field of the Disclosure

The present disclosure relates to a wireless communication apparatus and a wireless communication system.

Description of the Related Art

There is known a technique of regenerating a clock signal in an apparatus (hereinbelow, referred to as a clock regeneration apparatus) based on a signal, which is synchronized with a reference clock signal and wirelessly transmitted from an apparatus (hereinbelow, referred to as a clock source apparatus) including a reference clock signal source. Japanese Patent Application Laid-open No. 2014-116982 discusses a technique in which control information obtained from a synchronization state of a clock signal regenerated by a clock regeneration apparatus is fed back to a clock source apparatus and the clock source apparatus adjusts a phase of a transmission signal based on the control information.

In an environment in which a position of an antenna for performing communication changes or an object near a wireless transmission path moves, a phase of a signal changes due to an influence of a Doppler shift or a multipath caused by change of distance of the wireless transmission path. Hereinbelow, the phase change is referred to as "a phase change caused by variation of a wireless transmission path characteristic".

With the method discussed in Japanese Patent Application Laid-open No. 2014-116982, it is possible to synchronize the signal received by the clock regeneration apparatus with the clock signal regenerated from the received signal. Because the signal received by the clock regeneration apparatus is in synchronization with a reference clock signal, the reference clock signal of the clock source apparatus, the signal received by the clock regeneration apparatus, and the regenerated clock signal are in synchronization with each other in a case where a phase change caused by the variation of the wireless transmission path characteristic does not occur. However, in a case where the phase change caused by the variation of the wireless transmission path characteristic occurs, the reference clock signal of the clock source apparatus and the clock signal regenerated by the clock regeneration apparatus are not synchronized, which is an issue.

SUMMARY

The present disclosure is directed to a technique of synchronizing clock signals between apparatuses that wirelessly communicate with each other even in an environment in which the phase change caused by the variation of the wireless transmission path characteristic occurs.

According to an aspect of the present disclosure, a wireless communication apparatus includes a transmission circuit unit, a modulation unit, an encoding unit, a reception circuit unit, a phase adjustment unit, and an antenna unit, wherein the transmission circuit unit transmits a first modulated signal, as a first signal, which is encoded by the encoding unit based on a first clock signal and modulated by the modulation unit, to another wireless communication apparatus via a transmission path from the antenna unit, wherein the reception circuit unit generates a second clock signal based on a second signal received by the antenna unit from the other wireless communication apparatus, and wherein the phase adjustment unit detects a phase change caused by the transmission path based on the second clock signal, and controls a code of the first modulated signal based on the phase change.

Further features of the present disclosure will become apparent from the following description of exemplary embodiments with reference to the attached drawings.

DESCRIPTION OF THE EMBODIMENTS

Exemplary embodiments of the present disclosure will be described with reference to attached drawings. The following exemplary embodiments are not necessarily intended to limit the present disclosure. All the combinations of the features described in the following exemplary embodiments are not necessarily essential.

Figure 1:
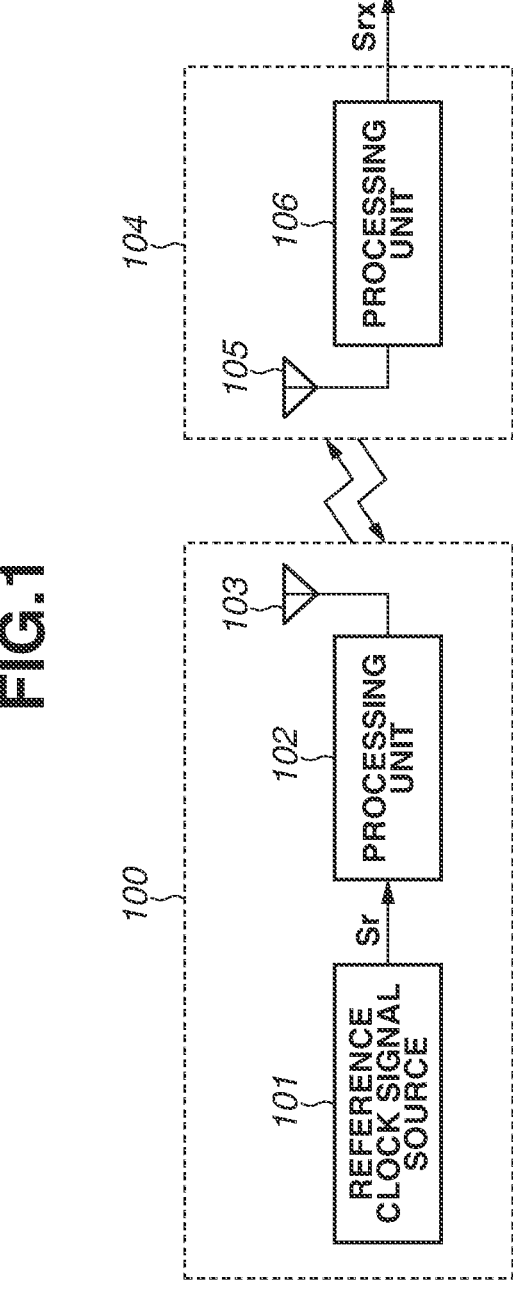
FIG. 1 is a block diagram illustrating a configuration of a wireless communication system according to one or more aspects of the present disclosure.

A configuration of an entire wireless communication system according to a first exemplary embodiment will be described. FIG. 1 illustrates the configuration of the wireless communication system according to the present exemplary embodiment. A clock source apparatus 100 is one of two apparatuses of which clock signals are to be synchronized. The clock source apparatus 100 includes a reference clock signal source 101 for generating a reference clock signal Sr, a processing unit 102 for performing various processing on the clock signal, and an antenna unit 103 for wirelessly transmitting and receiving signals. A clock regeneration apparatus 104 is the other apparatus of the two apparatuses of which the clock signals are to be synchronized. The clock regeneration apparatus 104 includes an antenna unit 105 for wirelessly transmitting and receiving signals, and a processing unit 106 for regenerating a clock signal by processing a received signal.

The reference clock signal source 101 of the clock source apparatus 100 generates the reference clock signal Sr, and the processing unit 102 processes the reference clock signal Sr. Then, the antenna unit 103 transmits the processed reference clock signal Sr. The antenna unit 105 of the clock regeneration apparatus 104 receives the signal transmitted from the antenna unit 103, and the processing unit 106 processes the received signal to regenerate a clock signal Srx. Then, the antenna unit 105 feeds back the regenerated clock signal Srx to the antenna unit 103. The processing unit 102 of the clock source apparatus 100 processes a signal to be transmitted again, based on the phase of the signal received by the antenna unit 103. Then, the antenna unit 103 transmits the processed signal. In this way, the wireless communication system according to the present exemplary embodiment repeatedly performs the feedback by transmitting the signals between the two apparatuses.

Eventually, the clock signal Srx synchronizes with the reference clock signal Sr. In this way, a system including the clock source apparatus 100 operating using the reference clock signal Sr, and a system including the clock regeneration apparatus 104 operating using the clock signal Srx can operate at a same timing within a range in which the wireless communications of the clock signals are possible.

Figure 2:
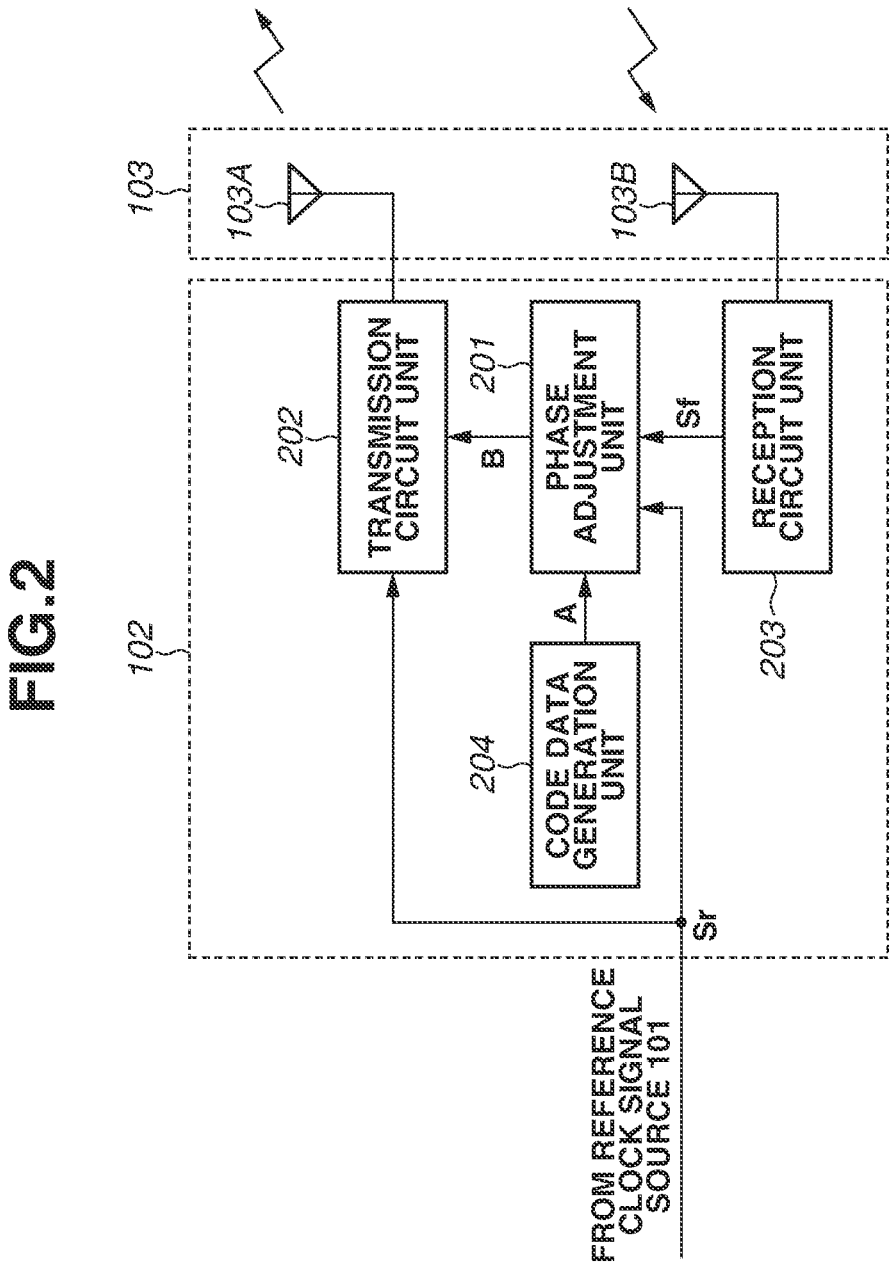
FIG. 2 is a block diagram illustrating a configuration of a clock source apparatus according to one or more aspects of the present disclosure.

Configurations and functions of the clock source apparatus 100 and the clock regeneration apparatus 104 will be described in more detail. FIG. 2 illustrates configurations of the processing unit 102 and the antenna unit 103 connected to the processing unit 102. The processing unit 102 includes a phase adjustment unit 201, a transmission circuit unit 202, a reception circuit unit 203, and a code data generation unit (encoding unit) 204. The antenna unit 103 includes a transmission antenna 103A and a reception antenna 103B. The code data generation unit 204 generates a coded signal A. "0" and "1" are desirably used at random and at equal frequency for the coded signal A. As a signal that satisfies this condition, for example, there is Pseudo-Random Binary Sequence (PRBS). Further, in a case where a data signal is to be transmitted with the clock signal, Manchester code, 6B10B, or the like may be used in combination with the PRBS. Assume that the coded signal A in the present exemplary embodiment is obtained by encoding PN9 by the 8B10B.

The phase adjustment unit 201 adjusts a phase of the coded signal A input from the code data generation unit 204, based on a phase of a clock signal Sf input from the reception circuit unit 203 and a phase of the reference clock signal Sr input from the reference clock signal source 101, to generate a coded signal B.

The transmission circuit unit 202 up-converts the coded signal B with a carrier wave signal generated from the reference clock signal Sr, and transmits the up-converted signal from the transmission antenna 103A to a wireless transmission path, as a wireless signal. The reception circuit unit 203 down-converts the wireless signal received by the reception antenna 103B, and outputs the down-converted signal to the phase adjustment unit 201, as the clock signal Sf. In an environment in which a wireless transmission path characteristic varies, the phase adjustment unit 201 detects a phase change caused by variation of the wireless transmission path characteristic from the fed-back wireless signal.

Figure 3:
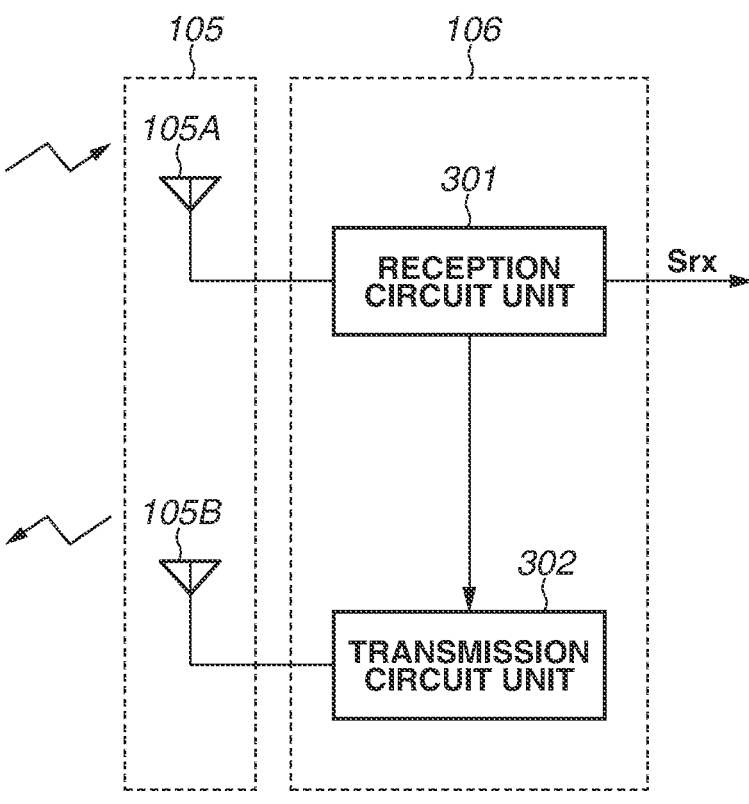
FIG. 3 is a block diagram illustrating a configuration of a clock regeneration apparatus according to one or more aspects of the present disclosure.

FIG. 3 illustrates configurations of the processing unit 106 and the antenna unit 105 connected to the processing unit 106. The processing unit 106 includes a reception circuit unit 301 and a transmission circuit unit 302. The antenna unit 105 includes a reception antenna 105A and a transmission antenna 105B. The reception circuit unit 301 down-converts the wireless signal received by the reception antenna 105A, regenerates the clock signal Srx, and inputs the clock signal Srx to the transmission circuit unit 302. The transmission circuit unit 302 up-converts the clock signal Srx input from the reception circuit unit 301, and outputs the up-converted clock signal Srx to the wireless transmission path. As described above, in the wireless communication system according to the present exemplary embodiment, the clock source apparatus 100 performs the phase adjustment of the clock signal. The clock regeneration apparatus 104 regenerates the clock signal from the received signal without performing the phase adjustment of the clock signal, and feeds back the received signal to the clock source apparatus 100.

Figure 4:
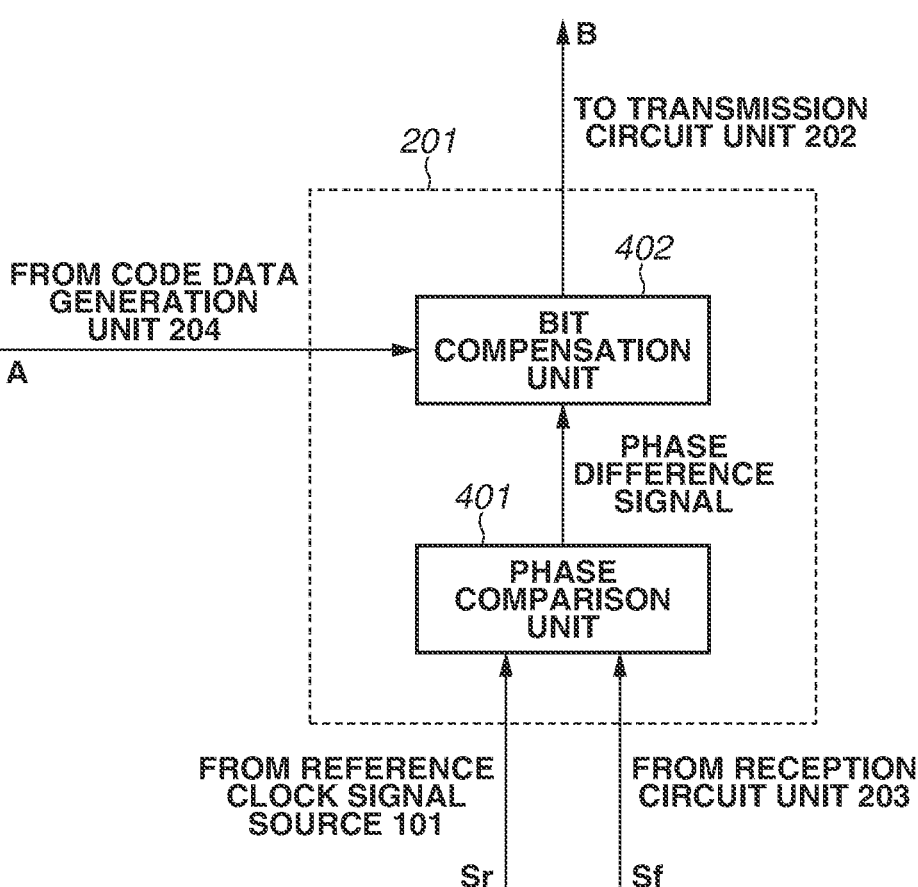
FIG. 4 is a block diagram illustrating a configuration of a phase adjustment unit according to the first exemplary embodiment.

FIG. 4 illustrates a circuit configuration of the phase adjustment unit 201 illustrated in FIG. 2. The phase adjustment unit 201 includes a phase comparison unit 401 and a bit compensation unit 402. The phase comparison unit 401 compares the phase of the reference clock signal Sr and the phase of the clock signal Sf obtained based on the wireless signal fed back from the clock regeneration apparatus 104, using, for example, a mixer, and outputs the detection result (phase difference signal) corresponding to the phase difference. The bit compensation unit 402 generates a correction signal C depending on the output of the phase comparison unit 401, and outputs the coded signal B by adding the correction signal C to the coded signal A. More specifically, the bit compensation unit 402 determines a compensation bit to be added, and the addition period of the compensation bit, depending on the phase difference signal.

Figure 5:
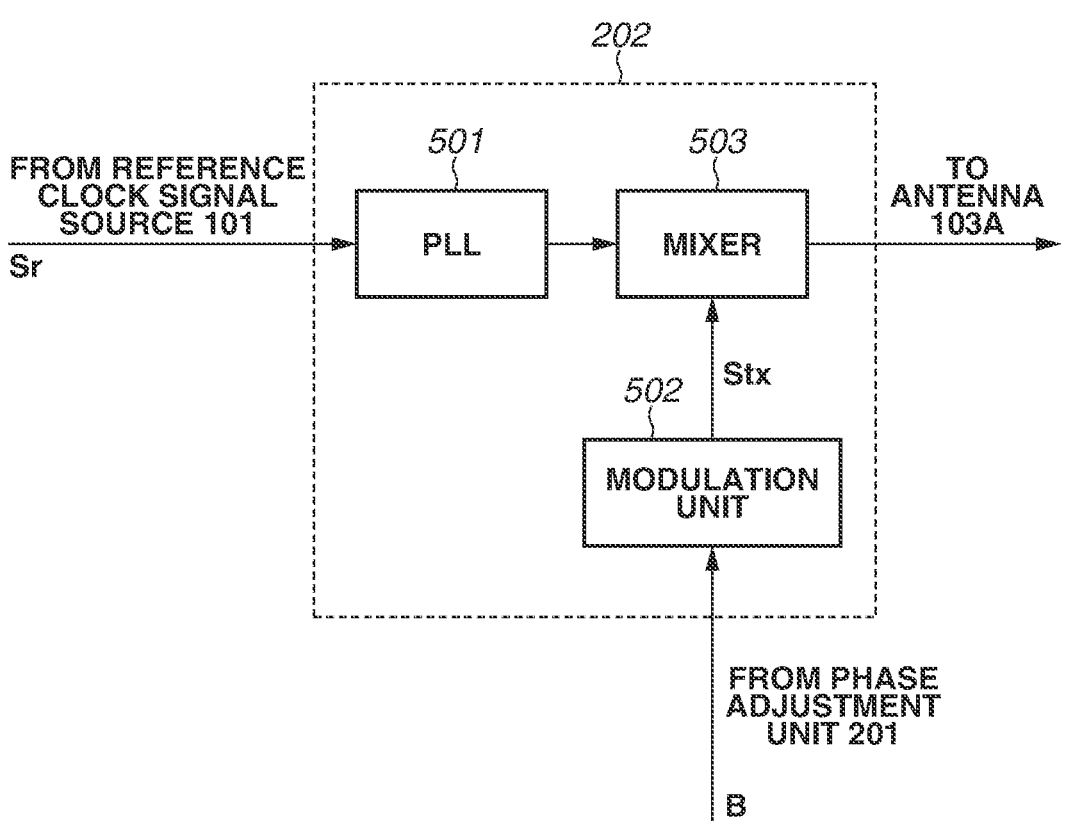
FIG. 5 is a block diagram illustrating a configuration of a transmission circuit unit according to one or more aspects of the present disclosure.

FIG. 5 illustrates a configuration of the transmission circuit unit 202 illustrated in FIG. 2. In FIG. 5, only the transmission circuit unit 202 is illustrated, but the transmission circuit unit 302 in FIG. 3 also has the same configuration. The transmission circuit unit 202 includes a Phase Locked Loop (PLL) 501, a modulation unit 502, and a mixer 503. The PLL 501 generates a carrier wave signal by up-converting the reference clock signal Sr into a signal with an arbitrary frequency, using an inner frequency divider. Thus, the reference clock signal Sr and the carrier wave signal are synchronized. The modulation unit 502 generates an In-Phase/Quadrature-Phase (IQ) modulated signal Stx based on the input coded signal B. The clock used when the IQ modulation is performed, the reference clock signal Sr or the output signal of the PLL 501 may be used, or a signal from an external clock source may be used. The mixer 503 mixes the input carrier wave signal and the IQ modulated signal Stx, and then outputs the mixed signal to the transmission antenna 103A.

The modulation method in the present exemplary embodiment is a Continuous Phase Frequency Shift Keying (CPFSK) method. With the CPFSK method, an average clock frequency of the IQ modulated signal Stx varies depending on the total number of "0"s and the total number of "1"s in the coded signal B. For example, the average clock frequency becomes lower as the number of "0"s is larger, and the average clock frequency becomes higher as the number of "1"s is larger. In a case where the modulation method is reversed, the average clock frequency becomes higher as the number of "0"s is larger, and the average clock frequency becomes lower as the number of "1"s is larger. The modulation method is not limited to the CPFSK method, and other modulation methods may be used.

Figure 6:
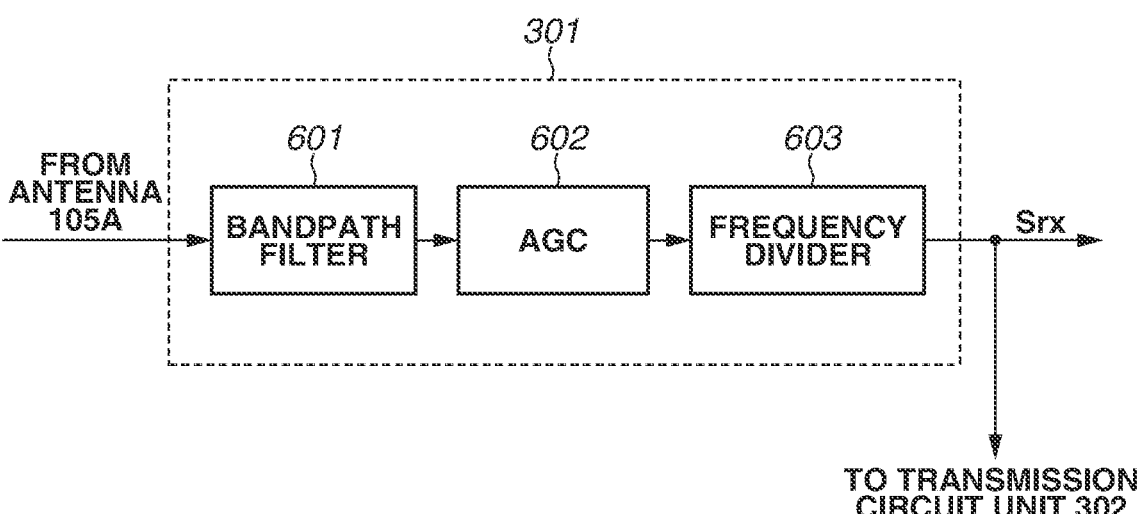
FIG. 6 is a block diagram illustrating a configuration of a reception circuit unit according to one or more aspects of the present disclosure.

FIG. 6 illustrates a configuration of the reception circuit unit 301 illustrated in FIG. 2. In FIG. 6, only the reception circuit unit 301 is illustrated, but the reception circuit unit 203 in FIG. 2 also has the same configuration. The reception circuit unit 301 includes a bandpath filter 601, an Automatic Gain Control (AGC) 602, and a frequency divider 603. The bandpath filter 601 allows signal components of the received signal only within a desired frequency band to pass. The AGC 602 adjusts an amplitude of the received signal to a certain level. The frequency divider 603 extracts the clock signal Srx by down-converting the received signal.

Figure 7:
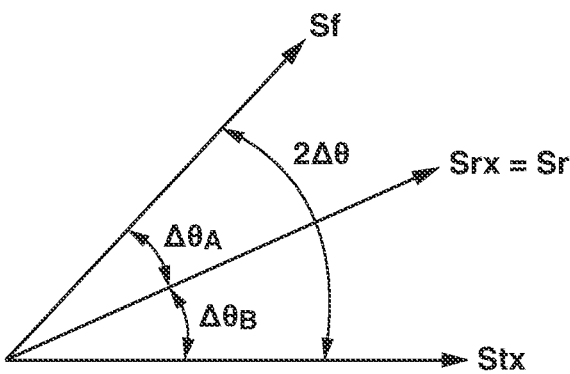
FIG. 7 is a diagram illustrating a phase relationship between clock signals according to one or more aspects of the present disclosure.

How the clock source apparatus 100 processes the fed-back received signal will be described. FIG. 7 illustrates a phase relationship between the clock signals to be compared by the phase adjustment unit 201 in a state where the reference clock signal Sr and the clock signal Srx regenerated by the clock regeneration apparatus 104 are in synchronization with each other. In FIG. 7, assume that the wireless transmission path characteristic is symmetrical, and a phase change amount caused by variation of the wireless transmission path characteristic is $\Delta\theta$. Because the transmitted wireless signal is fed back to reciprocate in the transmission path, the phase difference between the IQ modulated signal Stx and the clock signal Sf is $2\Delta\theta$. $\Delta\theta_A$ indicates a phase difference between the reference clock signal Sr and the clock signal Sf. $\Delta\theta_B$ indicates a phase difference between the IQ modulated signal Stx and the clock signal Srx. The phase adjustment unit 201 detects the phase difference $\Delta\theta$ by the phase comparison unit 401, and adjusts the phase of the coded signal A so as to be $\Delta\theta_A=\Delta\theta_B$. More specifically, the phase adjustment unit 201 adds "0" or "1" at a period of $\Delta d\theta/dt/2\pi$, depending on advancing or delaying of the phase change amount. In a case of $\Delta\theta_A=\Delta\theta_B$ ($=\Delta\theta$), the phase of the reference clock signal Sr and the phase of the clock signal Srx become equal, and thus, the clock signals of the apparatuses can be synchronized with each other. More specifically, the phase adjustment unit 201 detects the phase change amount caused by the variation of the wireless transmission path characteristic based on the fed-back wireless signal, to generate the IQ modulated signal Stx using the coded signal B that is generated by adding, to the coded signal A, the correction signal C, which causes a phase change opposite to the detected phase change. In this way, the clock signal Srx, which is the transmitted wireless signal including the phase change caused by the variation of the wireless transmission path characteristic being added thereto, can synchronize with the reference clock signal Sr.

The communication between the transmission antenna 103A and the reception antenna 105A, and the communication between the reception antenna 103B and the transmission antenna 105B may be performed using different frequencies to prevent interference. For example, a signal with a frequency f1 is used for the communication between the transmission antenna 103A and the reception antenna 105A, and a signal with a frequency f2 is used for the communication between the reception antenna 103B and the transmission antenna 105B. In this case, the frequency of the output signal of the PLL 501 of the transmission circuit unit 202 is f1 and the frequency of the IQ modulated signal Stx in the communication between the transmission antenna 103A and the reception antenna 105A, and the bandpath filter 601 of the reception circuit unit 301 allows only the frequency f1 to pass. In the communication between the reception antenna 103B and the transmission antenna 105B, two wireless communication paths can be separated by using the frequency f2 in the communication between the transmission circuit unit 302 and the reception circuit unit 203.

With the circuit configuration described above, even in the environment in which the phase change caused by the variation of the wireless transmission path characteristic occurs, the system capable of wirelessly synchronizing the clock signals of the two apparatuses can be provided.

A configuration of a wireless communication system according to a second exemplary embodiment will be described. The configuration of the wireless communication system according to the present exemplary embodiment is obtained by adding a switch for switching the encoded signal to the processing unit 102 according to the first exemplary embodiment, and other configurations are the same as those of the first exemplary embodiment. Thus, the configurations different from those of the first exemplary embodiment will be mainly described.

The PLL circuit in each of the transmission circuit unit 202 and the transmission circuit unit 302 described in the first exemplary embodiment requires a certain time period to output a stable phase signal after activation. The certain time period is referred to as a lock-in time period. Similarly, with the phase adjustment unit 201, the clock signals have a phase relationship as illustrated in FIG. 7, and a lock-in time is required to output a signal with a stable phase and frequency. Within the lock-in time period, the fed-back clock signal Sf includes the phase change of the output of the PLL circuit in addition to the phase change caused by the variation of the wireless transmission path characteristic. Thus, in the present exemplary embodiment, a description will be given of a configuration capable of reducing the lock-in time period from when the phase adjustment unit 201 detects only the phase change caused by the variation of the wireless transmission path characteristic until when the clock signals having a phase relationship illustrated in FIG. 7 are output.

Figure 8:
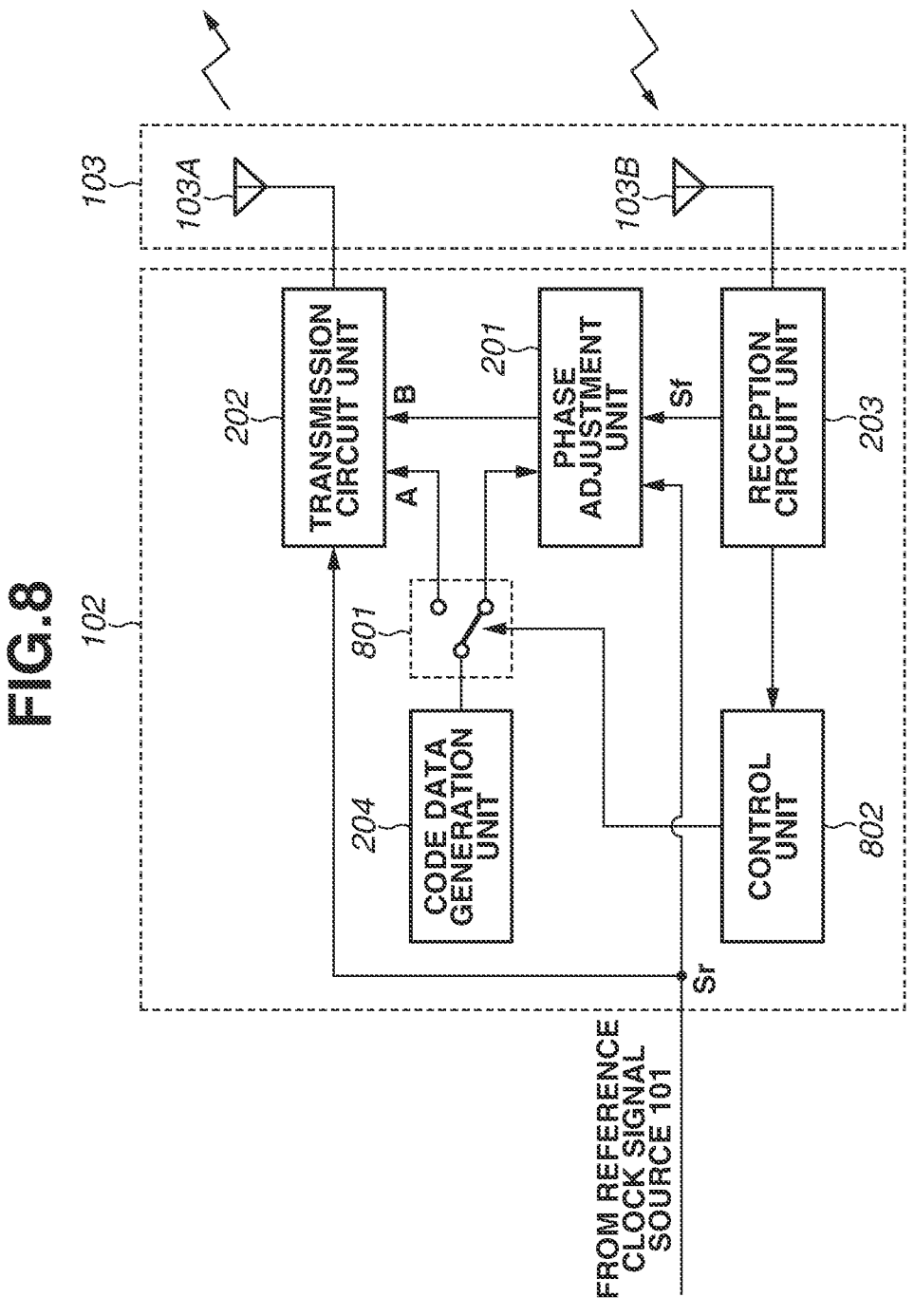
FIG. 8 is a block diagram illustrating a configuration of a clock source apparatus according to one or more aspects of the present disclosure.

FIG. 8 illustrates a configuration in which a switch (SW) 801 and a control unit 802 are added to the processing unit 102. The SW 801 is a switch for switching the encoded signal input to the transmission circuit unit 202 between the coded signal A and the coded signal B. In a case where the coded signal A is input to the transmission circuit unit 202, the SW 801 connects the code data generation unit 204 and the transmission circuit unit 202, and in a case where the coded signal B is input to the transmission circuit unit 202, the SW 801 connects the code data generation unit 204 and the phase adjustment unit 201. The control unit 802 controls timing of the switching operation of the SW 801.

Figure 9:
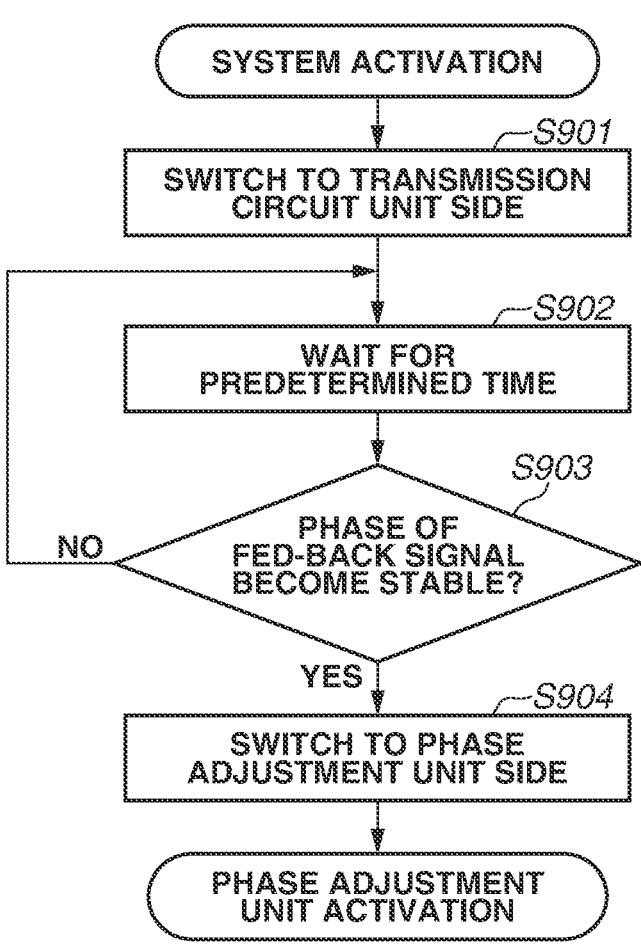
FIG. 9 is a flowchart illustrating a series of operations according to the second exemplary embodiment.

With reference to FIG. 9, an operation flow from an activation of the system to an activation of the phase adjustment unit 201 according to the present exemplary embodiment will be described. First, immediately after the activation of the system, in step S901, the control unit 802 controls the SW 801 to connect the code data generation unit 204 and the transmission circuit unit 202. In this case, the phase adjustment unit 201 does not operate, and the transmission circuit unit 202 transmits a wireless signal with a same phase as that of the reference clock signal Sr. In step S902, the system waits for a predetermined time until the phase of the output of the PLL circuit of each of the transmission circuit unit 202 and the transmission circuit unit 302 becomes stable. In step S903, the control unit 802 determines whether the phase becomes stable, and waits until the phase fluctuation of the clock signal Sf obtained from the fed-back wireless signal becomes stable, i.e., the output voltage of the PLL circuit is converged within a set value. At this time, the clock signal Sf only includes the phase change caused by the variation of the wireless transmission path characteristic.

In a case where the control unit 802 determines that the phases of the signal become stable (YES in step S903), the processing proceeds to step S904. In step S904, the SW 801 connects the code data generation unit 204 and the phase adjustment unit 201. Further, in step S904, the phase adjustment unit 201 operates, and starts the operation as the wireless clock synchronization system described in the first exemplary embodiment.

Figure 10:
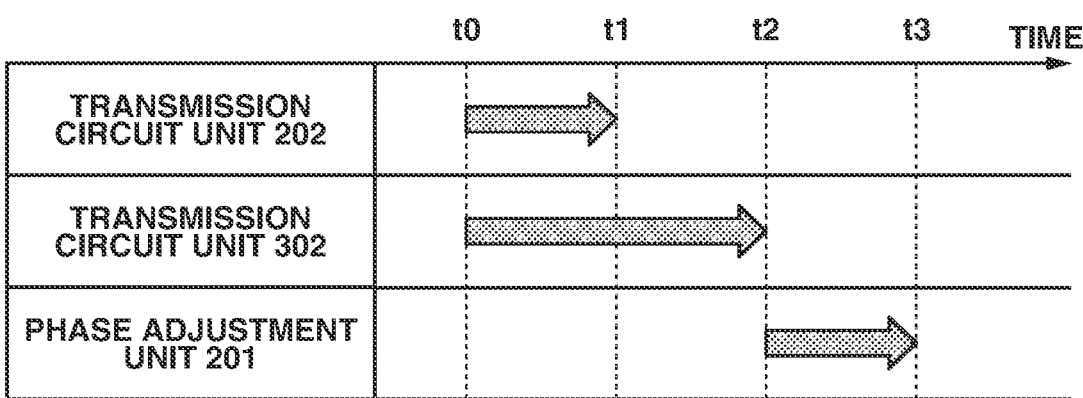
FIG. 10 is a time chart of each unit according to one or more aspects of the present disclosure.

FIG. 10 illustrates a time chart of each configuration block according to the present exemplary embodiment. The horizontal axis in FIG. 10 indicates time, and indicates a lock-in time of each circuit unit until the phase of the output thereof becomes stable. Time t0 is an activation time, times t1 and t2 indicate a lock-in time from the activation time t0 of the transmission circuit unit 202 and a lock-in time from the activation time t0 of the transmission circuit unit 302, respectively, and time t3 indicates a lock-in completion time of the phase adjustment unit 201 according to the present exemplary embodiment.

In a case where all the circuit units including the phase adjustment unit 201 are activated at a time without providing the SW 801, a lock-in time for each circuit unit increases, and the lock-in time for the entire system increases, as a result.

By starting the operation of the phase adjustment unit 201 at the time t2 according to the flowchart illustrated in FIG. 9, the operation of the entire system can be stabilized and total lock-in time from the times t0 to t3 can be reduced compared with the first exemplary embodiment.

A PLL circuit may be provided as a frequency divider, or to remove jitter in each of the reception circuit unit 301 and the reception circuit unit 203. In this case, if the phase adjustment unit 201 is operated after waiting for the lock-in time period from the activation of each transmission and reception circuit unit, the same effect as that described above can be obtained.

According to the present disclosure, the clock signals of the apparatuses performing wireless communication can be synchronized, even in the environment in which the phase change caused by the variation of the wireless transmission path characteristic occurs.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-078498, filed May 11, 2022, which is hereby incorporated by reference herein in its entirety.

What is claimed is:

1. A wireless communication apparatus comprising:
a transmission circuit unit configured to transmit a first signal to another wireless communication apparatus via a first antenna unit;
an encoding unit configured to, based on a first clock signal, generate an encoded signal;
a modulation unit configured to, based on the encoded signal, generate a modulation signal that is the first signal
a reception circuit unit configured to, based on a second signal received from the other wireless communication apparatus via a second antenna unit, generate a second clock signal; and
a phase adjustment unit, the phase adjustment unit including a phase comparison unit and a bit compensation unit, the phase comparison unit being configured to output a phase difference signal based on a phase difference between the first clock signal and the second clock signal, the bit compensation unit being configured to determine a compensation bit to be added and an addition period of the compensation bit, based on the phase difference signal,
wherein the bit compensation unit inserts the compensation bit into the encoded signal at a bit boundary determined by the first clock signal to correct timing drift between the first clock signal and the second clock signal,
wherein after receipt of the second signal, the encoding unit outputs, to the modulation unit, a code to which the compensation bit is added, and
based on the code, the modulation unit performs modulation.

2. The wireless communication apparatus according to claim 1, wherein the compensation bit is 0 or 1.

3. The wireless communication apparatus according to claim 1, further comprising:
a switch configured to switch a unit to which the first clock signal is to be output to any one of the transmission circuit unit and the modulation unit, and the phase adjustment unit, and
a control unit configured to determine that a state where there is no output from the encoding unit is a stable state, and control the switch based on a determination result.

4. The wireless communication apparatus according to claim 1,
wherein the other wireless communication apparatus includes
another reception circuit unit configured to, based on the first signal received via a third antenna unit, generate a third clock signal;
another encoding unit configured to, based on the third clock signal, generate an encoded signal;
another modulation unit configured to, based on the encoded signal, generate a modulation signal that is the second signal; and
another transmission circuit unit configured to transmit the second signal to the wireless communication apparatus via a fourth antenna unit.

5. A wireless communication system comprising:
a first wireless communication apparatus; and
a second wireless communication apparatus,
wherein the first wireless communication apparatus includes:
a first transmission circuit unit configured to transmit a first signal to another wireless communication apparatus via a first antenna unit,
a first modulation unit configured to, based on the encoded signal, generate a modulation signal that is the first signal,
a first encoding unit configured to, based on a first clock signal, generate an encoded signal,
a first reception circuit unit configured to, based on a second signal received from the other wireless communication apparatus via a second antenna unit, generate a second clock signal, and
a phase adjustment unit, the phase adjustment unit including a phase comparison unit and a bit compensation unit, the phase comparison unit being configured to output a phase difference signal based on a phase difference between the first clock signal and the second clock signal, the bit compensation unit being configured to determine a compensation bit to be added and an addition period of the compensation bit, based on the phase difference signal, wherein the bit compensation unit inserts the compensation bit into the encoded signal at a bit boundary determined by the first clock signal to correct timing drift between the first clock signal and the second clock signal, wherein after receipt of the second signal, the encoding unit outputs, to the first modulation unit, a code to which the compensation bit is added, and based on the code, the first modulation unit performs modulation wherein the second wireless communication apparatus includes:

a second transmission circuit unit configured to transmit the second signal to the wireless communication apparatus via a fourth antenna unit, a second modulation unit configured to, based on the encoded signal, generate a modulation signal that is the second signal, a second encoding unit configured to, based on the third clock signal, generate an encoded signal, and a second reception circuit unit configured to, based on the first signal received via a third antenna unit, generate a third clock signal.

6. The wireless communication apparatus according to claim 1, wherein the first signal transmitted via the first antenna and the second signal transmitted via the second antenna are different in frequency from each other.

7. The wireless communication apparatus according to claim 1, wherein in the encoded signal, 0 and 1 are at random and at substantially equal frequency.

8. The wireless communication apparatus according to claim 1, wherein the modulation unit generates the modulation signal using continuous phase frequency shift keying (CPFSK).

* * * * *